United States Patent [19]

Cox et al.

[11] Patent Number: 5,319,669
[45] Date of Patent: Jun. 7, 1994

[54] HAZARDOUS WASTE MELTER

[75] Inventors: Stephen F. Cox, Perrysburg; Ray S. Richards, Sylvania, both of Ohio

[73] Assignee: Stir-Melter, Inc., Perrysburg, Ohio

[21] Appl. No.: 823,991

[22] Filed: Jan. 22, 1992

[51] Int. Cl.⁵ .......................................... C03B 5/027
[52] U.S. Cl. ..................................... 373/29; 373/27; 373/30; 373/34; 373/35; 373/79; 373/85; 373/116; 65/134; 252/629
[58] Field of Search ...................... 373/27-30, 373/33, 35, 79, 81, 85, 110, 111, 112, 115, 116; 210/695, 710, 719; 423/244; 65/27, 134, 335; 252/629; 159/7, 25.1; 422/159

[56] References Cited

U.S. PATENT DOCUMENTS

| | | | |
|---|---|---|---|
| 1,956,171 | 4/1934 | Hitner | 373/35 |
| 2,877,280 | 3/1959 | Eden | 373/29 |
| 3,020,324 | 2/1962 | Curtis | 373/32 |
| 3,350,187 | 10/1967 | Brichard et al. | 65/134 |
| 3,358,066 | 12/1967 | Tiede et al. | 373/28 |
| 3,585,268 | 6/1971 | Monks et al. | 65/134 |
| 3,754,886 | 8/1973 | Richards et al. | 65/134 |
| 3,767,090 | 10/1973 | Sundberg et al. | 222/383 |
| 3,819,350 | 6/1974 | Pellett et al. | 65/134 |
| 3,850,606 | 11/1974 | Rough | 373/29 |
| 3,988,138 | 10/1976 | Rough | 373/36 |
| 4,032,704 | 6/1977 | Stenkvist | 373/85 |
| 4,139,360 | 2/1979 | Piper | 252/645 |
| 4,299,611 | 11/1981 | Penberthy | 65/27 |
| 4,366,571 | 12/1982 | Palmquist | 373/30 |
| 4,424,149 | 1/1984 | Bege et al. | 252/629 |
| 4,528,011 | 7/1985 | Macedo et al. | 65/30.13 |
| 4,627,069 | 12/1986 | Harvey et al. | 373/29 |
| 4,632,689 | 12/1986 | De Willigen et al. | 65/78 |
| 4,632,690 | 12/1986 | Colwell, Jr. et al. | 65/134 |
| 4,635,570 | 1/1987 | Ewest et al. | 110/237 |
| 4,710,266 | 12/1987 | Hayashi et al. | 159/7 |
| 4,725,383 | 2/1988 | Hayashi et al. | 252/629 |
| 4,735,400 | 4/1988 | Tate et al. | 373/95 |
| 4,782,497 | 11/1988 | Sasaki et al. | 373/29 |
| 4,793,933 | 12/1988 | Rostoker et al. | 210/710 |
| 4,797,232 | 1/1989 | Aubert | 252/629 |
| 4,847,008 | 7/1989 | Boatner et al. | 252/629 |
| 4,895,678 | 1/1990 | Ohtsulen et al. | 373/29 |
| 4,906,409 | 3/1990 | Leister | 252/629 |
| 4,943,395 | 7/1990 | Sasaki et al. | 252/629 |
| 5,120,342 | 6/1992 | Richards | 65/178 |

OTHER PUBLICATIONS

C. T. Randall et al., "Off-Gas System For The Savannah River Plant Defense Waste Processing Facility", presentation at the ANS Spectrum 1986 International Meeting.

(List continued on next page.)

Primary Examiner—Bruce A. Reynolds
Assistant Examiner—Tu Hoang
Attorney, Agent, or Firm—Brooks & Kushman

[57] ABSTRACT

An apparatus for processing various hazardous waste materials by melting in a vessel for subsequent solidification is disclosed which includes a seal for the cover thereof. Melter includes a high-speed mixing impeller powered by a drive shaft which extends through an opening in the cover. The vessel is electrically heated by discharge of electrical energy through the melt contained in the vessel. In one embodiment the impeller and shaft are included in the electrical heating circuit. A shaft seal engages the shaft at a point spaced from the cover. An axially extensible seal seals a space bounded by the shaft seal and the opening in the cover. Purge gas is supplied to the sealed space to provide positive gas flow from the sealed space into the vessel. A cold wall transport duct for off-gas porting is disclosed. A bottom drain structure including a sleeve and plug is also disclosed. The output of the melter may be subsequently heated in a holding tank to refine the output.

26 Claims, 4 Drawing Sheets

OTHER PUBLICATIONS

C. G. Sombret, "Melters and Furnace Equipment Used For Radioactive Waste Conditioning" Proceeding of the 1987 Int'l Waste Management Conference, the ASME, pp. 259–263, 1987.

R. S. Richards, "Rapid Melting and Refining System", Ceramic Bulletin, vol. 67, No. 11 (1988), pp. 1806–1809.

U. S. Patent Application Serial No. 510,556, filed Apr. 18, 1990, "Method and Apparatus For Waste Vitrification".

R. S. Richards et al., "Small High-Speed Glass Melter For Waste Vitrification", ACS Dallas, Apr. 23, 1990.

D. F. Bickford et al., "Application of High Level Waste-Glass Technology to the Volume Reduction and Immobilization of Tru, Low-Level and Mixed Wastes", 1991.

R. S. Richards et al., "Stir-Melter® Vitrification of Simulated Radioactive Waste, Fiber Glass Scrap, and Municipal Waste Combustor Fly Ash", 1991.

WV-2 Waste Vitrifier System, Glasstech, Inc., Stir-Melter® System brochure, 1991.

WV-9 Waste Vitrifier System, Glasstech, Inc., Stir-Melter® System brochure, 1991.

fig-3 fig-4

HAZARDOUS WASTE MELTER

TECHNICAL FIELD

The present invention relates to an apparatus for processing deleterious waste by melting at high temperature for subsequent cooling and solidification to form a leach resistant mass. More particularly, the present invention relates to a melter having a high-speed mixing impeller including improvements relating to sealing the melter, off-gas porting, drain construction and providing a post processing holding tank.

BACKGROUND ART

Generation of vast quantities of waste material from sources such as municipal incinerators, nuclear reactors, nuclear weaponry manufacture and chemical industries present monumental problems for disposal. Land-fill is inappropriate for the most deleterious substances without prior processing to prevent leaching into the ground water. Radioactive material with a half-life of thousands of years presents the challenge of providing a permanent storage mechanism which substantially prevents release of radioactive contaminants into the environment.

Various techniques have been developed for vitrifying nuclear waste including a static melter at Savannah River Laboratories. Developments at the Savannah River Laboratories are described in the article "Application Of High Level Waste-Glass Technology To The Volume Reduction And Immobilization Of Tru, Low Level, And Mixed Wastes" by Bickford, D. F., NSRC-MS-90-274.

In a prior application of Ray S. Richards, Ser. No. 510,556 filed on Apr. 18, 1990, one of the applicants herein, a high-speed mixer/melter was disclosed in which a shaft rotates an impeller at high speeds in a melt contained in a vessel. Electrical energy is simultaneously discharged through the melt between the walls of the vessel and the impeller. One problem encountered with the previous mixer/melter designs related to sealing the cover to prevent the escape of gases from the vessel. Providing an elastomeric seal on the cover of a vessel operating in excess of 1,000° C. will only result in the melting of the seal. Providing mechanical seals of an electrically conductive material could establish an electrically conductive path and result in a short circuit between the impeller shaft and the walls of the vessel. An alloy having excellent corrosion resistance, such as alloy 690, is preferably used to construct the vessel, including the vessel cover.

Axial adjustment of the location of the impeller by moving the shaft axially relative to the cover presents additional sealing problems. It may be necessary to adjust the height of the impeller in the vessel depending upon the density of the output required, quantity of melted material contained in the vessel, and the like.

Another problem relating to off-gas porting from the vessel relates to maintaining a clear port through which hot gases may be removed without blocking the port as gases cool upon removal from the vessel. A film cooler was proposed in "Off-Gas System For The Savannah River Plant Defense Waste Processing Facility" by Randall, C. T. et al., in which steam is injected through angled slots formed in a sleeve through which off-gases are ported. The film cooler allows off gases to cool while preventing the solidification of condensed gases on the walls of the off-gas port. One problem encountered by this device relates to the difficulty in removing the film cooler from the vessel for service or replacement. Another problem presented by the design proposed by the Randall article is the large volume of coolant fluid comprising air and steam, which is required. In addition, the cost of fabricating a film cooler having machined slots for directing the fluid is substantial.

Another problem faced by prior art hazardous waste melters related to providing a bottom drain which is selectively sealable and provides a redundant sealing mechanism whereby the flow of molten material may be prevented by freezing such flow.

Another problem presented by certain waste streams is the need to provide a chamber for superheating molten material to above 1,100° C. for a period of time to dissolve any crystalline material remaining in the melt after processing in the high-speed mixer/melter. At such extreme high temperatures, problems relating to durability of a tank lined with an alloy are encountered. Ensuring adequate holding time for molten material contained in the vessel presents additional problems.

Additional problems encountered by prior art melters are solved by the present invention as summarized below.

SUMMARY OF INVENTION

According to the present invention, an apparatus for processing hazardous waste, or otherwise deleterious material, by melting is disclosed. The apparatus includes a vessel for containing a melt and having a headspace defined above the melt containing heated gases. Generally, the vessel has an inlet port for receiving feed material, an outlet port for removing molten material from the vessel and an off-gas port for removing steam and gaseous reaction products from the head space. The apparatus includes an impeller for mixing feed material into the melt which is driven by a rotatable shaft having an end extending outwardly from the vessel. Heating means are provided for discharging electrical energy through the molten material in the vessel. A cover is secured to the top of the vessel and has an opening through which the shaft is received. A shaft seal engages the rotatable shaft at a point which is maintained at a cooler temperature than the headspace.

Preferably, means for sealing a space bounded by the shaft seal and the opening in the cover may be provided into which purge gases may be supplied at a pressure greater than the pressure in the headspace whereby heated gases in the headspace are inhibited from moving through the opening toward the shaft seal. the cover also may be formed, at least in part, of insulative material.

Several different types of sealing means may be used to define the sealed space between the shaft seal and the opening of the cover. For example, a boot seal, a series of seal lips on telescopic walls or a liquid seal in which an moveable wall is partially submerged may function as the seal.

According to other aspects of the invention, the shaft is water cooled sufficiently to inhibit transfer of heat to the seal. The cover may also include an axially extensible shield connected between a drive head assembly and the cover. The shaft seal and one part of the sealing means remain stationary with the vessel while one part of the sealing means moves axially with the drive head assembly whereby the sealed space remains sealed even as the drive head assembly is moved axially relative to the vessel.

According to another aspect of the invention, an apparatus for processing waste material by melting is disclosed wherein a vessel as generally described above is provided with an off-gas port for venting steam and reaction gases from the headspace of the vessel. The off-gas port includes a heated receptacle having an off-gas inlet end secured to the vessel and an off-gas outlet end secured to a film cooler is provided for transmitting off-gases and maintaining them in their heated condition to prevent condensation prior to entry into a cold wall transport duct. The receptacle preferably includes electrical heating coils for maintaining the temperature of the receptacle and a refractory seal or gas shield is preferably provided between the receptacle and the film cooler.

The cold wall transport duct comprising a sleeve having a primary conduit through which off-gases are ported. The sleeve includes porous walls defining a primary conduit within an outer wall concentric with and enclosing the porous walls. An annulus is defined between the primary conduit and the outer wall through which air and steam may be injected and forced through the porous walls. The porous walls are preferably sintered metal having interstitial openings through which the cooling fluid may be directed.

According to another aspect of the invention, an apparatus for processing waste material including a vessel and heating means as previously described is also provided with an improved bottom drain means for draining the vessel. The bottom drain comprises an elongated plug, having an interior opening selectively cooled by a cooling fluid. A heated sleeve, having a reduced orifice defines a conduit extending from an opening in a lower portion of the vessel to the exterior of the vessel. The conduit is preferably selectively cooled with a cooling fluid or heated by heating elements such as heating coils. The elongated plug is inserted in the conduit to selectively close the conduit.

According to another aspect of the invention an apparatus for processing waste material is disclosed in which a vessel containing a melt which is acted upon by an impeller and heating means is further processed. After molten material is removed from the vessel, it is retained in the holding tank in fluid flow communication with the outlet port of the vessel. The holding tank includes means for heating the molten material after removal from the vessel for a predetermined period of time at a controlled temperature. The holding tank includes a serpentine path defined by baffles which support the metal cover and assure a predetermined holding time of the melt output within the holding tank. The holding tank preferably includes heating elements in the cover and well-insulated walls which are lined with an alloy metal to guard against leakage.

These and other advantages of the present invention will become more readily apparent upon review of the attached drawings in light of the following detailed description of some preferred embodiments of the invention.

BEST MODE FOR CARRYING OUT THE INVENTION

Figure 1:
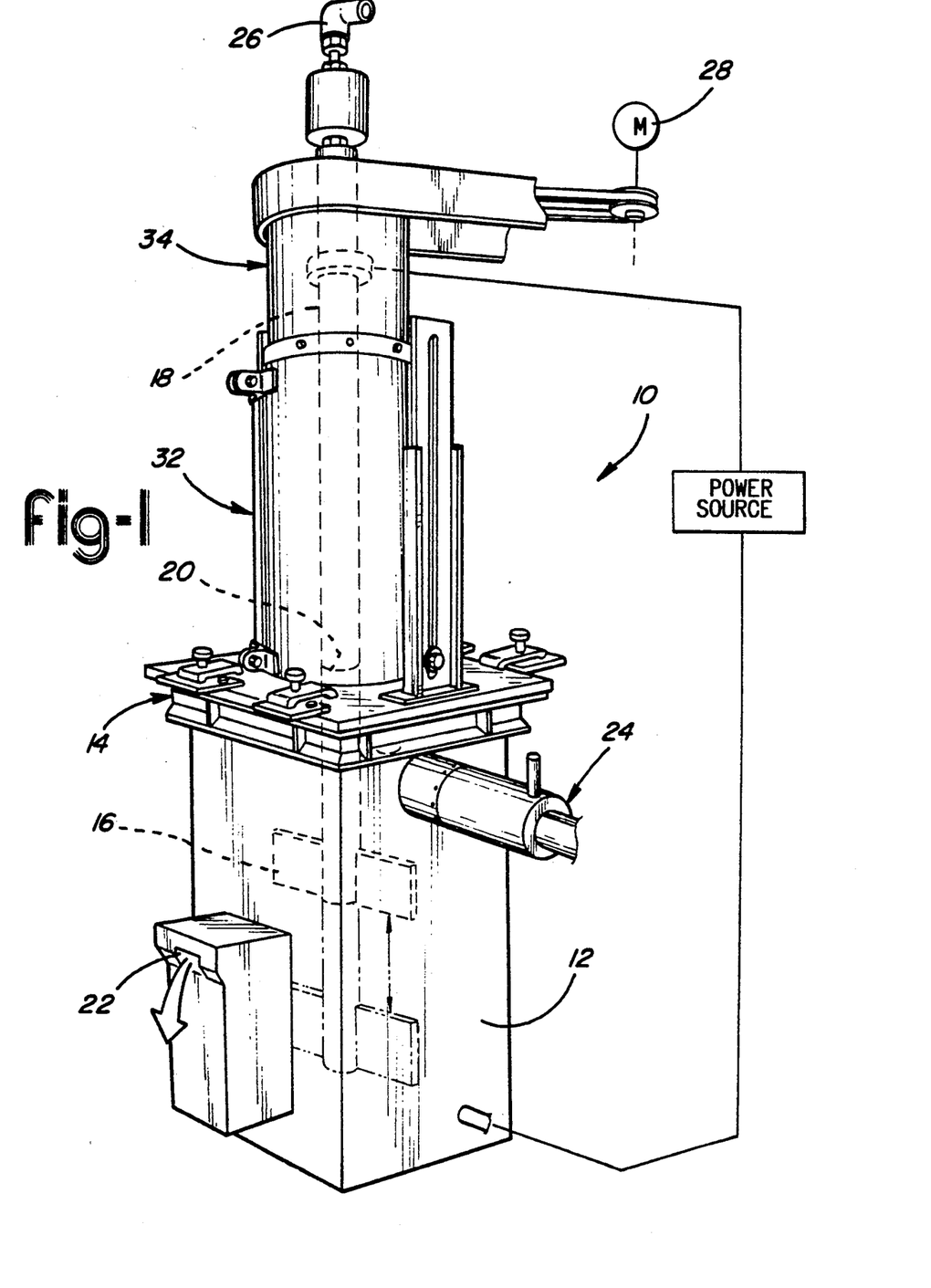
FIG. 1 is a perspective view of the waste processing apparatus of the present invention.

Referring now to FIG. 1, a waste melter apparatus 10 is illustrated. The waste melter apparatus 10 includes a vessel 12 having a cover assembly 14 clamped onto it as will be more fully described below. An impeller 16 carried by a shaft 18 extends through the cover assembly 14 through an opening 20 formed in the cover. An outlet spout 22 is provided for pouring molten material from the vessel. An off-gas port 24 allows for the release of steam and gaseous reaction products from the head space in the vessel above the melt. A cooling water fitting 26 is provided at the upper end of the shaft 18. A motor 28 is shown schematically for driving the shaft 18. An electrical heating circuit is also shown diagrammatically in FIG. 1 whereby electrical energy is supplied to the walls of the vessel 12 and the shaft 18 of the impeller 16 so that the contents of the vessel can be heated by Joule-effect heating.

Figure 2:
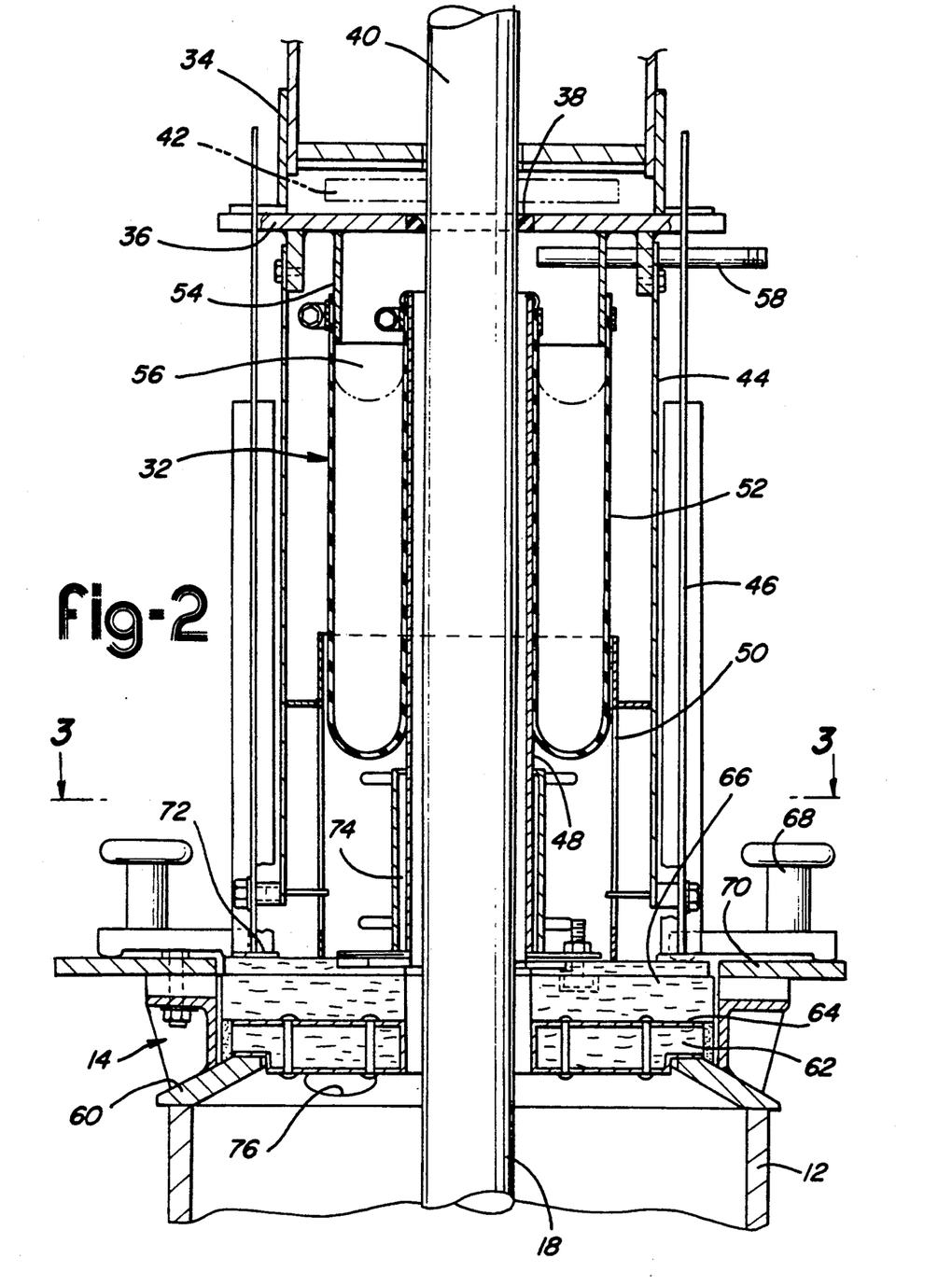
FIG. 2 is a cross-sectional view of the seal assembly according to one embodiment of the present invention.

Referring now to FIG. 2, one embodiment of a seal assembly 32 is shown which seals the shaft 18 to the cover assembly 14. A portion of drive head assembly 34, also shown in FIG. 2, is moveable relative to the vessel 12 in a vertical direction, or axially relative to the shaft. A bearing support frame 36 forms part of the drive head assembly 34. A shaft seal 38 is secured to the bearing support frame 36 which holds the shaft seal 38 stationary while the shaft 18 is free to rotate and engage an upper portion 40 of the shaft. Shaft bearing 42 is provided to control the rotation of the shaft.

An outer shield annulus 44 is affixed to the bearing support frame 36 and is movably connected to a plurality of guides 46 which are supported on the cover assembly 14. An inner shield annulus 48 is supported by the cover assembly 14 and surrounds the shaft 18. A shield extension annulus 50 is disposed between the outer shield annulus 44 and the inner shield annulus 48. The shield extension annulus 50 is connected to the outer shield annulus 44 and is adapted to lift the shield extension annulus 50 from the cover assembly 14 as the drive head assembly 34 moves away from the vessel 12.

A boot seal 52 is secured on its outer radius to a head annulus 54 which is secured to the bearing support frame 36. The inner diameter of the boot seal 52 is secured to the inner shield annulus 48. The boot seal 52 and shaft seal 38 form a sealed space 56 in conjunction with the bearing support frame 36, head annulus 54, and shaft 18. The sealed space 56 is open to a limited extent to the head space of the vessel 12 due to the clearance between the shaft 18 and the inner shield annulus 48. A purge gas inlet tube 58 is supported by the bearing support frame 36 and allows for the introduction of gas into the sealed space 56 to pressurize the sealed space 56 and provide a positive gas flow from the sealed space 56 into the vessel 12. The purge gas may be air, steam, a mixture of air and steam or another gas.

Figure 3:
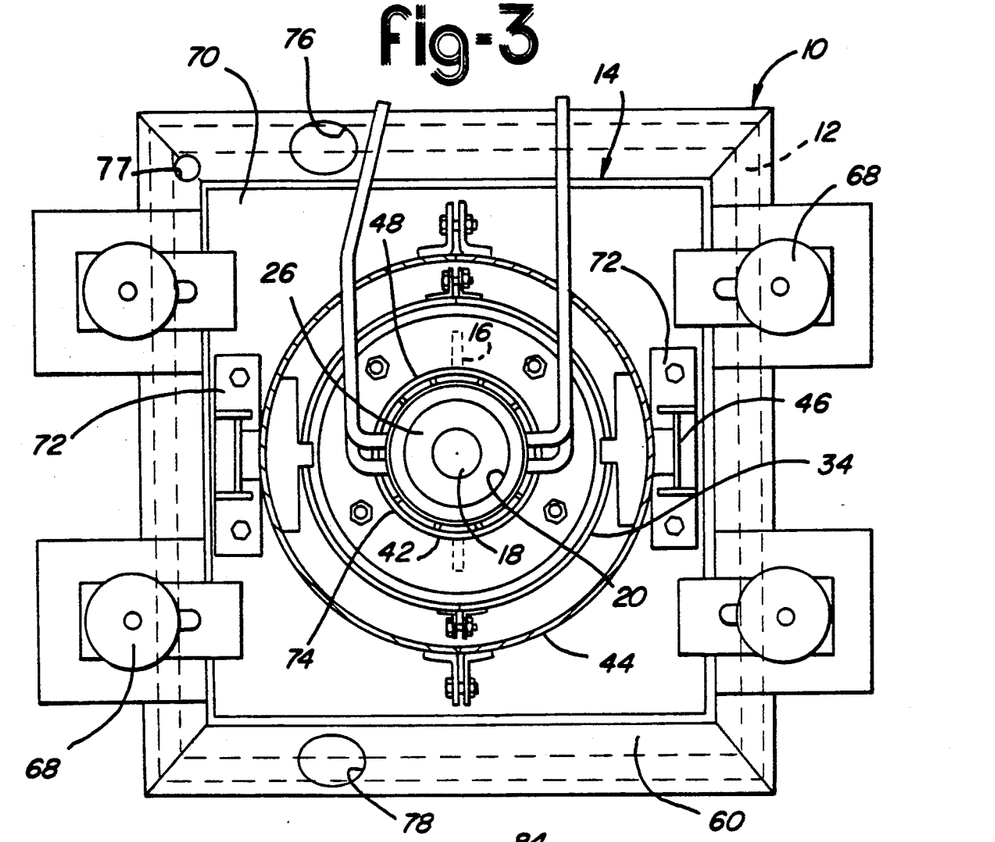
FIG. 3 is a top plan view of the mixer/melter of the present invention.

The cover assembly 14 will be described with reference to FIGS. 2 and 3. The cover assembly 14 includes a rim 60 which is affixed to the vessel 12. An insulation plate 62 is disposed on the rim 60 and is enclosed in a metal jacket 64. The insulation plate 62 is jacketed to provide an impervious barrier which prevents escape of hazardous material from the vessel 12. A secondary insulation plate 66 is placed on top of the insulation plate 62 and is clamped by clamp 68 under the base 70 of the seal assembly 32. Clamp 68 holds the base 70, secondary insulation plate 66 and insulation plate 62 in place on the top of the vessel 12. Guides 46 have base flanges 72 which are fastened to the top of the base 70.

A cooling jacket 74 is disposed about the inner shield annulus 48 adjacent to the base 70. A cooling medium such as water, steam or air is circulated through the cooling jacket 74 to cool the inner shield annulus 48.

An observation opening 76 is provided in the bevelled surface of the rim 60. An instrumentation access port 77 is provided to allow for insertion of instrumentation or control probes. An feed inlet opening 78 is likewise provided in the rim 60.

Figure 4:
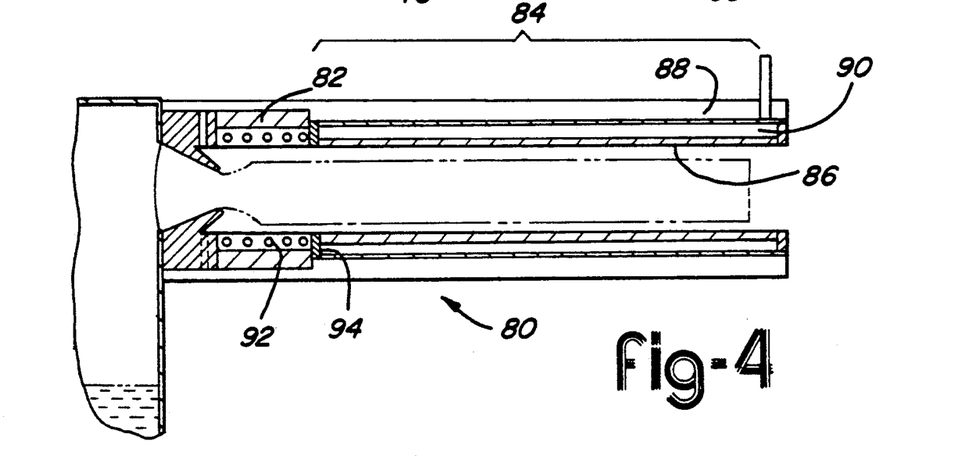
FIG. 4 is a cross-sectional view of an off-gas cold wall transport duct according to the present invention.

Referring now to FIG. 4, a side wall off-gas port assembly 80 includes a receptacle 82 and a transport duct 84. Transport duct 84 includes a porous inner wall 86 which is contained within an outer wall 88. An annulus 90 is provided between the porous inner wall 86 and the outer wall 88. Air, water or steam are supplied to the annulus 90. The cooling fluid then passes through the porous inner wall 86 to create a cold wall transport duct for the off-gases. For example, in a one square foot surface area vessel, an exhaust cooling tube section having an inner diameter of 2¼" and length of 16" could be provided with a Mott Metalurigical Corp. 0.5 micron porus metal sleeve.

The receptacle 82 preferably includes a plurality of heating coils 92 which keep the off-gases at an elevated temperature immediately after leaving the vessel 12. A seal 94, such as ceramic seal or gas seal, is provided between the receptacle 82 and the transport duct 84.

Figures 5, 6, 7, 8:
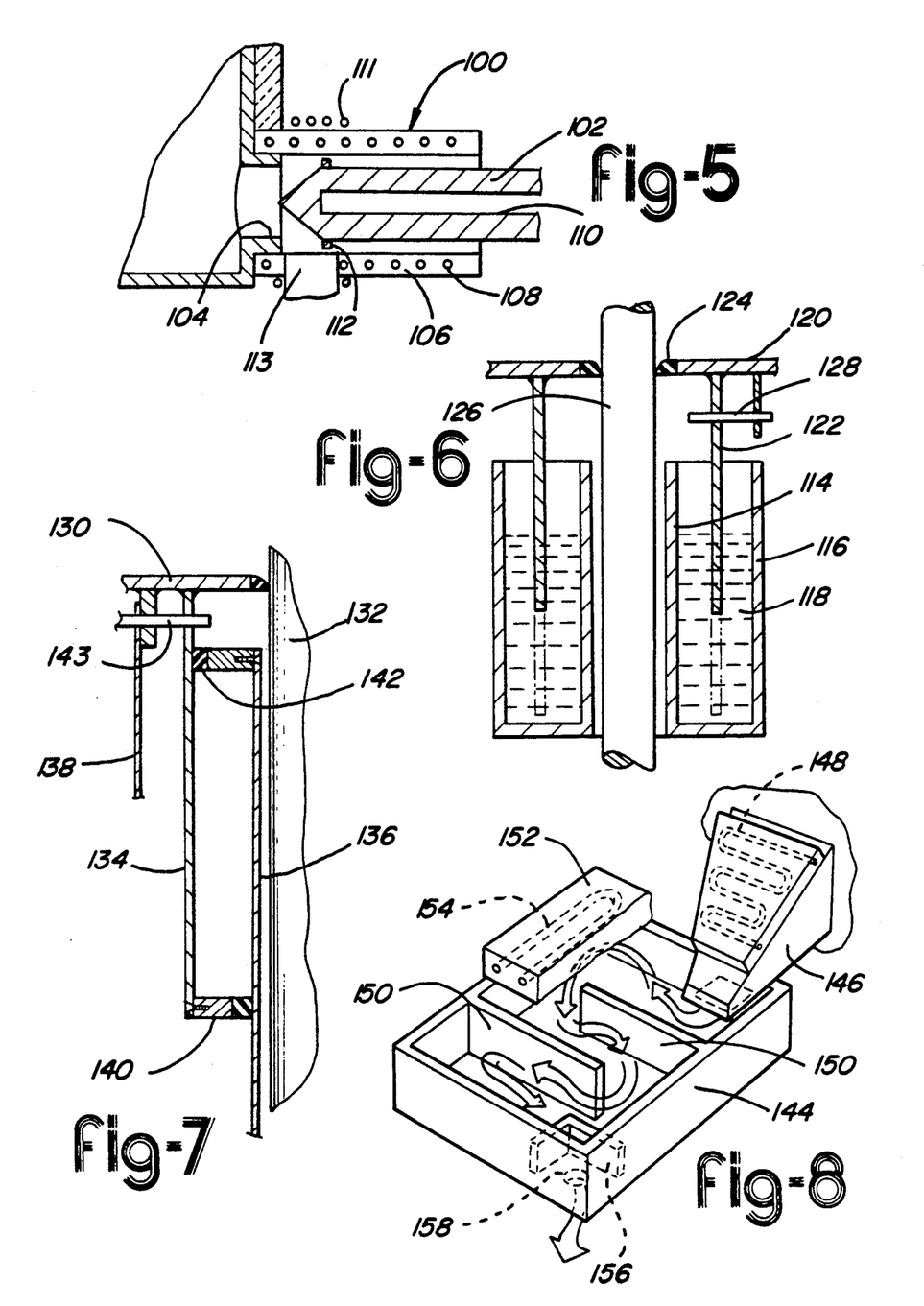
FIG. 5 is a cross-sectional view of a bottom drain assembly for a vessel made in accordance with the present invention.
FIG. 6 is a cross-sectional view showing an alternative seal assembly construction.
FIG. 7 is a cross-sectional view showing an alternative seal assembly.
FIG. 8 is a diagrammatic perspective view of a holding tank made in accordance with the present invention.

Referring now to FIG. 5, a drain assembly 100 is illustrated in greater detail. The drain assembly 100 is closed by a torpedo plug 102 which is mechanically driven into a reduced orifice 104 through a sleeve 106. The sleeve 106 is equipped with heating coils 108. Torpedo plug 102 includes a cooling fluid channel 110. Cooling fluid may be circulated in the cooling fluid channel 110 causing the melt adjacent the drain assembly 100 to freeze. A cooling coil 111 is shown disposed about the sleeve 106 for aiding in freezing off the drain assembly 100. A drip lip 112 may be required on the end of the torpedo plug 102 to direct melt draining from the orifice 104 into a drain port 113. It should be understood that heating coils 108 could be used for heating or cooling if desired depending upon the relative temperature of fluid transported. It is also known to inductively heat coils such as those shown at 108.

Referring now to FIG. 6, an alternative embodiment of a seal assembly is shown. An inner wall 114 and outer wall 116 are used to contain a fluid 118. A head assembly 120 supports an annular wall 122 which is axially movable within the fluid 118 to provide an axially extensible seal. A shaft seal 124 forms a seal on the surface of the shaft 126. A purge gas inlet 128 supplies air to the space between the fluid 118 and the shaft seal 124 to pressurize it and minimize any flow of hot gases from the vessel, not shown, between the inner Wall 114 and the shaft 126.

Referring now to FIG. 7, another alternative embodiment of the seal assembly is shown wherein the head assembly 130 and shaft 132 are axially movable and yet remain sealed. An outer wall 134, an inner wall 136 are telescopic relative to one another and provide the axially movable seal. A shield 138 comprising an annular member extends downwardly from the head assembly 130. An inner wall wiping seal 140 is supported by the outer wall 134 and an outer wall wiping seal 142 is supported by the inner wall 136. A purge gas inlet 133 is provided to pressurize the space between the shaft seal 124 and an outer wall wiping seal 142 thereby inhibiting the flow of hot gases along the shaft 132 toward the shaft seal 124 and wiping seals 140 and 142.

Referring now to FIG. 8, a holding tank 144 is shown in which the melt upon leaving the vessel may be superheated and held for a period of time to melt any remaining crystalline particles in the output from the vessel. An outlet spout 146 of a vessel supplies molten material to the holding tank 144. The outlet spout 146 is preferably heated by means of heating coils 148 which prevent freeze up of the outlet spout 146. The holding tank 144 includes a series of baffles 150 which direct the flow of molten material through the holding tank 144. Baffles 150 extend the full height of the holding tank 144 to aid in supporting the cover 152. A series of heating coils 154 are provided in the cover 152 to heat the molten material as it passes through the holding tank 144. A weir 156 is preferably provided about a drain 158. Molten material flows over the weir 156 and out the drain 158. After leaving the holding tank, the molten material is solidified and preferably directed into containers for storage.

The preceding description of several preferred embodiments of the invention are provided by way of illustration and are not intended to be limiting. The scope of the invention should be measured with reference to the following claims.

What is claimed is:

1. An apparatus for processing waste material comprising:
    a vessel containing a melt, the vessel having a head space defined above the melt containing heated gases, said vessel having an inlet port for receiving feed material in said vessel, an outlet port for removing molten material from the vessel, and an exhaust port for removing off gases from the vessel;
    impeller means for mixing waste material into said melt, said impeller means being secured to a rotatable shaft disposed at least in part in said vessel and having an end portion extending outwardly away from said vessel;
    heating means for discharging electrical energy through said molten material in said vessel;
    a cover secured to the top of the vessel, said cover having an opening through which said rotatable shaft is received with said end portion extending outwardly therefrom;
    a shaft seal engaging said end portion of said rotatable shaft; and
    means for cooling said end portion of said shaft to maintain the temperature of said shaft below a level that would harm said shaft seal.

2. The apparatus of claim 1 further comprising a space bounded by said shaft seal and said opening in said cover; and means for sealing said space.

3. An apparatus for processing waste material comprising:

a vessel containing a melt, the vessel having a head space defined above the melt containing heated gases, said vessel having an inlet port for receiving feed material in said vessel, an outlet port for removing molten material from the vessel, and an exhaust port for removing off gases from the vessel;

impeller means for mixing waste material into said melt, said impeller means being secured to a rotatable shaft disposed at least in part in said vessel and having an end portion extending outwardly away from said vessel;

heating means for discharging electrical energy through said molten material in said vessel;

a cover secured to the top of the vessel, said cover having an opening through which said rotatable shaft is received with said end portion extending outwardly therefrom;

a shaft seal engaging said end portion of said rotatable shaft at a point maintained at a lower temperature than said heated gases in said head space of the vessel; and means for supplying a gas to said space at a first pressure greater than a second pressure in said head space whereby positive gas flow is provided from the space to said head space whereby heated gases in said head space are inhibited from moving through said opening toward said shaft seal.

4. The apparatus of claim 2 wherein said means for sealing a space is a boot seal interconnecting an annular wall supported by said cover and an annular wall supported by a frame which is axially movable with said impeller means.

5. The apparatus of claim 2 wherein said means for sealing a space is a seal lip disposed on a first telescopic wall for engagement with a second telescopic wall.

6. The apparatus of claim 2 wherein said means for sealing a space comprises a first annular wall supporting a first seal lip and a second annular wall telescopically engaging said first wall and having a seal lip disposed thereon for engagement with the first telescopic wall.

7. The apparatus of claim 2 wherein said means for sealing a space is a liquid reservoir supported on said cover and an axially shiftable annular wall supported by a support structure which is movable with said impeller means, said annular wall being axially shiftable while remaining partially submerged in the liquid reservoir to maintain a seal as the impeller means is moved axially.

8. The apparatus of claim 2 wherein said shaft seal and said means for sealing a space are not rotated while said shaft is rotated relative thereto.

9. The apparatus of claim 2 wherein said means for sealing a space includes a first part which remains stationary with said vessel, and a second part moves axially with a drive head assembly whereby said space remains sealed as the drive head assembly is moved axially relative to the vessel.

10. The apparatus of claim 2 wherein an axially extendible shield is concentrically mounted relative to said rotatable shaft and said means for sealing is located within the axially extensible shield.

11. The apparatus of claim 1 wherein said rotatable shaft is water cooled along a portion of its length to cool said shaft seal.

12. The apparatus of claim 1 wherein the shaft seal is mounted on a drive head assembly and moved axially with said shaft relative to said vessel.

13. An apparatus for processing hazardous waste feed material comprising:

a vessel containing a melt, said vessel having a inlet port for receiving feed material in said vessel, an exhaust port for removing off gases from said vessel, and an outlet port for removing molten material from the vessel;

heating means for discharging electrical energy through said molten material in said vessel;

an off-gas port means for venting steam and reaction gases from said vessel, said off-gas port means having a heated receptacle having an off-gas inlet end secured to said vessel and an off-gas outlet end secured to a cold wall transport duct comprising a sleeve having a primary conduit through which off-gases are ported, said sleeve having porous walls of pre-determined porosity defining said primary conduit and an outer wall concentric with and enclosing said porous walls and defining an annulus therebetween, a cooling fluid being injected into said annulus and forced through said porous walls.

14. The apparatus of claim 13 wherein said porous walls are sintered metal having interstitial openings through which the cooling fluid is directed.

15. The apparatus of claim 13 wherein said receptacle has electrical heating coils.

16. The apparatus of claim 13 wherein a refractory seal is provided between said receptacle and said cold wall transport duct.

17. The apparatus of claim 13 wherein a gas shield is provided between said receptacle and said cold wall transport duct.

18. An apparatus of claim 13 wherein an impeller means for mixing feed material into said melt is disposed in said vessel.

19. An apparatus for processing hazardous waste feed material comprising:

a vessel containing a melt, said vessel having an inlet port for receiving feed material in said vessel and having an outlet port for removing said melt from the vessel;

heating means for discharging electrical energy through said melt in said vessel;

bottom drain means for draining said vessel comprising a moveable plug having an interior opening selectively cooled by a cooling fluid, a heated sleeve defining a conduit extending from a reduced orifice in a lower portion of said vessel to a location outside said vessel, said moveable plug having actuating means for selectively closing said conduit.

20. The apparatus of claim 19 wherein said plug has drip lip.

21. The apparatus of claim 19 wherein a quantity of solidified material is accumulated within said heated sleeve and said heated sleeve includes electric coils for heating said heated sleeve to melt said quantity of solidified material within the conduit.

22. The apparatus of claim 19 wherein said bottom drain means is horizontally oriented and extends from a side wall of said vessel.

23. An apparatus for processing hazardous waste feed material comprising:

a vessel containing a melt, said vessel having an inlet port for receiving feed material in said vessel, an exhaust port for removing off-gases from said vessel, and having an outlet port for removing molten material from said vessel;

impeller means for mixing feed material into said melt;

heating means for discharging electrical energy through said molten material in said vessel; and a holding tank in fluid flow communication with said outlet port comprising a tank having means for heating a molten material after being removed from said vessel for a predetermined period of time at a controlled temperature said holding tank having a serpentine path defined by a plurality of baffles.

24. An apparatus for processing hazardous waste feed material comprising:

a vessel containing a melt, said vessel having an inlet port for receiving feed material in said vessel, an exhaust port for removing off-gases from said vessel, and having an outlet port for removing molten material from said vessel;

impeller means for mixing feed material into said melt;

heating means for discharging electrical energy through said molten material in said vessel; and a holding tank in fluid flow communication with said outlet port comprising a tank having means for heating a molten material after being removed from said vessel for a predetermined period of time at a controlled temperature from a bottom wall of said tank to a cover forming a top wall, said holding tank having a plurality of baffles defining a non-linear path, said baffles supporting the cover of the holding tank and wherein said molten material is maintained in said holding tank at a higher temperature than the molten material resident in said vessel.

25. The apparatus of claim 23 wherein said means for heating comprise a plurality of heating elements disposed in a cover of said holding tank.

26. The apparatus of claim 23 wherein said outlet port includes heater coils for maintaining the temperature of molten material disposed within the outlet port.

* * * * *